United States Patent
Sarkar et al.

(10) Patent No.: US 11,544,669 B2
(45) Date of Patent: Jan. 3, 2023

(54) COMPUTING FRAMEWORK FOR COMPLIANCE REPORT GENERATION

(71) Applicant: ORACLE FINANCIAL SERVICES SOFTWARE LIMITED, Mumbai (IN)

(72) Inventors: Subrata Sarkar, Bangalore (IN); Amit Kumar Sahoo, Cuttack (IN); Amit Kumar Jayee, Bangalore (IN); K R. Srikant, Bhubaneswar (IN); Raghavendra Sharma Karri, Bangalore (IN)

(73) Assignee: Oracle Financial Services Software Limited, Mumbai (IN)

( * ) Notice: Subject to any disclaimer, the term of this patent is extended or adjusted under 35 U.S.C. 154(b) by 401 days.

(21) Appl. No.: 15/632,482

(22) Filed: Jun. 26, 2017

(65) Prior Publication Data

US 2018/0374047 A1    Dec. 27, 2018

(51) Int. Cl.
*G06Q 10/10* (2012.01)
*G06F 16/245* (2019.01)
*G06F 16/248* (2019.01)

(52) U.S. Cl.
CPC .......... *G06Q 10/10* (2013.01); *G06F 16/245* (2019.01); *G06F 16/248* (2019.01)

(58) Field of Classification Search
CPC ...... G06Q 10/10; G06F 16/245; G06F 16/248
USPC ....................................................... 715/762
See application file for complete search history.

(56) References Cited

U.S. PATENT DOCUMENTS

| | | | |
|---|---|---|---|
| 7,523,135 B2 | 4/2009 | Bradford et al. | |
| 7,584,414 B2 | 9/2009 | Mortensen | |
| 7,930,228 B1 | 4/2011 | Hawkins et al. | |
| 8,099,370 B2 | 1/2012 | Ohata | |

(Continued)

FOREIGN PATENT DOCUMENTS

WO    2016000037 A1    1/2016

OTHER PUBLICATIONS

Iris, "Iris Fatca Application: A World-wide FATCA Reporting Solution for Financial Institutions"; pp. 1-4, downloaded on Dec. 14, 2016 from: http://www.irisbusiness.com/sites/default/files/iris_fatca_reporting_solution_004.pdf.

(Continued)

*Primary Examiner* — William L Bashore
*Assistant Examiner* — David Faber
(74) *Attorney, Agent, or Firm* — Kraguljac Law Group, LLC (57) ABSTRACT

Systems, methods, and other embodiments associated with a framework for compliance report generation are described. In one embodiment, a method includes receiving a data source definition of a set of data sources comprising data for populating compliance reports. The example method may also include retrieving a compliance report definition for a compliance report for a reporting entity. The example method may also include constructing and rendering a user interface populated with a set of user interface elements generated based upon the set of data sources and the compliance report definition. The example method may also include generating the compliance report according to the compliance report definition. The compliance report is populated with data from the set of data sources. The compliance report is sent over a computing network to a remote computing device of the reporting entity.

17 Claims, 6 Drawing Sheets

(56) References Cited

U.S. PATENT DOCUMENTS

| | | | | |
|---|---|---|---|---|
| 8,813,178 B1* | 8/2014 | Khanna | ................ | G06Q 10/10 726/1 |
| 9,323,428 B1 | 4/2016 | Maguire et al. | | |
| 9,607,058 B1* | 3/2017 | Gupta | ................ | G06K 9/2081 |
| 2002/0099735 A1* | 7/2002 | Schroeder | ............ | G06Q 30/06 715/239 |
| 2006/0036525 A1* | 2/2006 | Ramos | ................ | G06Q 10/10 705/35 |
| 2006/0129499 A1* | 6/2006 | Combar | ............... | G06Q 20/102 705/64 |
| 2007/0061719 A1* | 3/2007 | Law | .................... | G06Q 10/107 715/700 |
| 2008/0016086 A1* | 1/2008 | Chang | ................ | G06F 16/248 |
| 2008/0120129 A1* | 5/2008 | Seubert | ............... | G06Q 40/125 705/305 |
| 2008/0126395 A1* | 5/2008 | Marueli | ............... | G06F 16/211 707/999.102 |
| 2008/0212845 A1* | 9/2008 | Lund | ..................... | G06V 30/40 715/224 |
| 2008/0228822 A1* | 9/2008 | Jarboe | .................. | G06Q 10/10 |
| 2010/0316031 A1* | 12/2010 | Sasao | ..................... | H04W 8/22 370/338 |
| 2011/0179051 A1* | 7/2011 | Bruckner | ............. | G06F 16/248 707/758 |
| 2012/0054095 A1* | 3/2012 | Lesandro | ............. | G06Q 20/10 705/39 |
| 2012/0089610 A1* | 4/2012 | Agrawal | ............... | G06Q 10/00 707/741 |
| 2013/0117400 A1* | 5/2013 | An | ..................... | H04L 63/0823 709/206 |
| 2013/0325720 A1 | 12/2013 | Bennett et al. | | |
| 2015/0134555 A1* | 5/2015 | Fancher | ............ | G06Q 10/1053 705/321 |
| 2016/0071226 A1* | 3/2016 | Karale | .................. | G06Q 10/00 705/3 |
| 2016/0246991 A1* | 8/2016 | Bell | ..................... | G06F 21/6245 |
| 2017/0116335 A1* | 4/2017 | Baby | .................... | H04L 67/563 |
| 2017/0140110 A1* | 5/2017 | Haddad | .............. | G06F 3/04847 |
| 2018/0096301 A1* | 4/2018 | Kirk | ...................... | G06F 16/638 |
| 2018/0129816 A1* | 5/2018 | Schmidt | ............ | G06F 21/6218 |
| 2018/0173477 A1* | 6/2018 | Porwal | .................. | G06F 3/1287 |
| 2018/0210919 A1* | 7/2018 | Mazumder | ............. | G06F 16/13 |

OTHER PUBLICATIONS

Lombard Risk, "Automated Regulatory Compliance Solution"; pp. 1-4, downloaded on Dec. 14, 2016 from: http://www.lombardrisk.com/files/Lombard-Risk-Automated-regulatory-compliance.pdf.

Lombard Risk, "AgileREPORTER"; pp. 1-9, 2016, downloaded on Dec. 14, 2016 from: http://www.lombardrisk.com/solutions/regulatory-reporting/agilereporter/.

Axiomsl, "Regulatory Reporting—AxiomSL", pp. 1-8, downloaded on Dec. 14, 2016 from: http://www.axiomsl.com/solutions/regulatory-reporting/.

* cited by examiner

COMPUTING FRAMEWORK FOR COMPLIANCE REPORT GENERATION

BACKGROUND

Many businesses, such as financial institutes, are required to report certain data to compliance reporting agencies. For example, a bank may do business in multiple countries. Each country has one or more compliance reporting agencies to which the bank is required to report compliance data, such as suspicious activity reports. Unfortunately, each country and/or reporting agency can have different compliance report formats, such as compliance reports having different extensible mark-up language (XML) structures. For example, a reporting agency in the United States may require submission of compliance reports according to a first structure of 10 data fields. However, a reporting agency in France may require submission of compliances reports according to a second structure of 7 data fields. Thus, data fields and/or document structures and layouts can differ from reporting agency to reporting agency and from country to country. Accordingly, the bank must write custom code and programs to handle each type of compliance report format, which is inefficient, requires extensive coding knowledge, and wastes substantial amounts of computing resources to development, store, and maintain multiple programs and user interfaces for each different compliance report format.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that provide for a computing platform for generating compliance reports. The computing platform is configured to provide data integration and ingestion functionality, user interface construction functionality, validation functionality, report generation functionality, and acknowledgement processing functionality. The data integration and ingestion functionality is configured to connect to various data sources specified by an entity, such as a business, for extracting data used to fill out compliance reports. In one embodiment, the business may specify that 4 columns within two tables are to be used to populate fields within compliance reports for a first reporting entity. The business may specify that 9 columns within 3 tables are to be used to populate fields within compliance reports for a second reporting entity.

The user interface construction functionality is configured to dynamically determine which user interface elements should be used to construct a user interface for a particular compliance report type and source data. In one embodiment of constructing a user interface for generating a compliance report for the first reporting entity, 4 user interface elements are generated/selected for representing 4 fields of a compliance report that will be populated with data from the 4 columns. In one embodiment of constructing a user interface for generating a compliance report for the second reporting entity, 9 user interface elements are generated/selected for representing 9 fields of a compliance report that will be populated with data from the 9 columns. In this way, the user interface is constructed and rendered so that the business can view, edit, and/or validate information used to create the compliance report. The user interface construction functionality is configured to create reporting screens, define user roles, and define workflows.

The validation functionality is used to validate source data used to populate the compliance report and/or to validate the compliance report. The validation functionality can import validation rules from a document such as from a spreadsheet document. Validation can be performed upon fields within the user interface. Validation supports mandatory and conditional mandatory field validations.

The report generation functionality is configured to generate the compliance report according to a particular format requested by the reporting entity. In one embodiment, the reporting entity provides an XML scheme definition (XSD) used to define the structure expected for an XML compliance report. In this way, the report generation functionality can dynamically generate, populate, and submit the compliance report according to a compliance report definition provided by the reporting entity. The acknowledgement processing functionality is configured to parse and process an acknowledgement from the reporting entity provided in response to the compliance report being submitted to the reporting entity. In one embodiment, a reporting entity comprises a regulator, a government entity, a private entity, a business, or any other entity to which a business may be required to report certain information, such as for financial compliance regulatory reporting by a bank.

Figure 1:
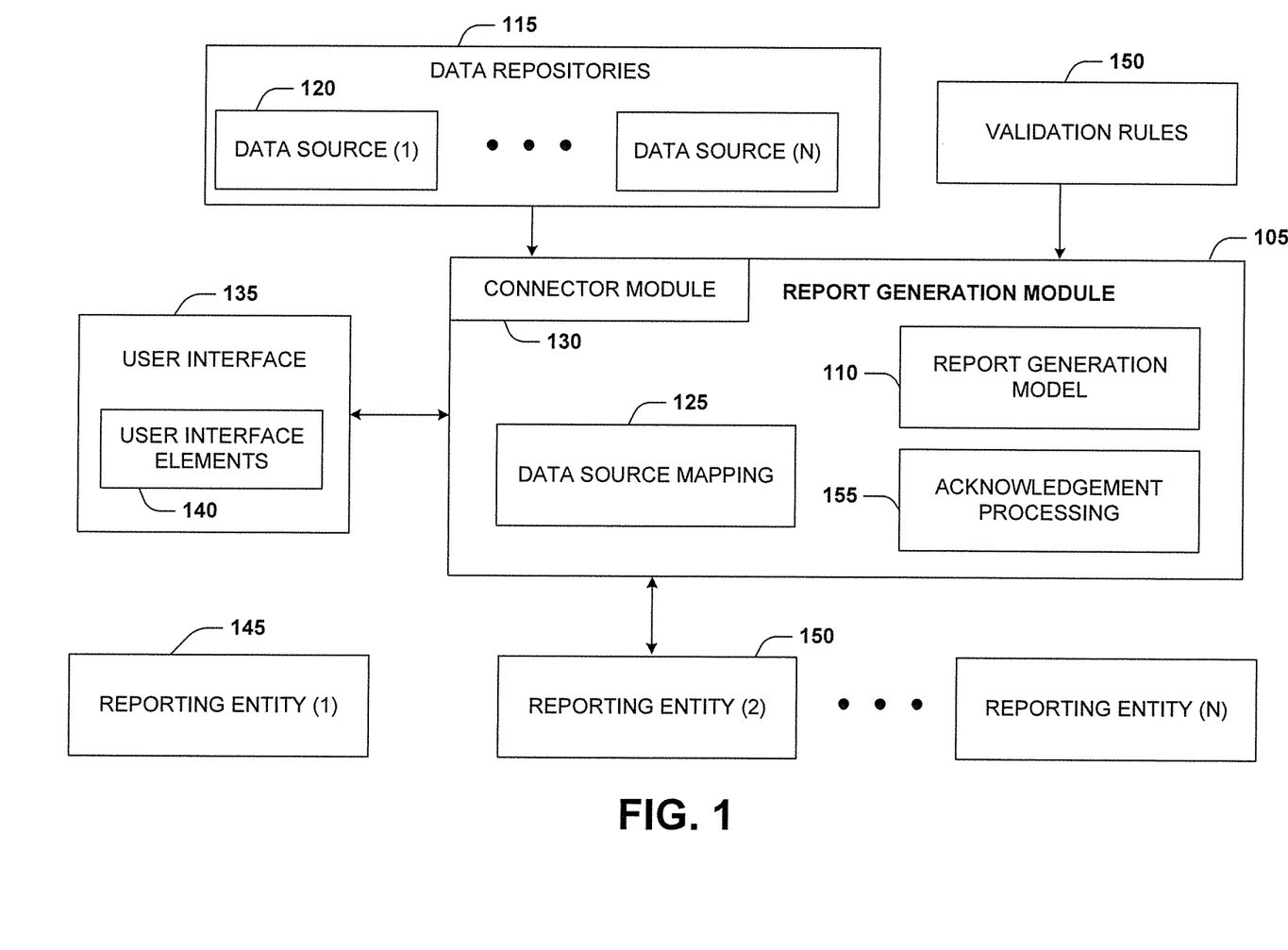
FIG. 1 illustrates an embodiment of a system associated with compliance report generation.

With reference to FIG. 1, one embodiment of a computer system 100 associated with computing platform for generating compliance reports is illustrated. The system 100 includes a report generation module 105, which can be configured to execute on a computer, such as computer 515 of FIG. 5. In one embodiment, the report generation module 105 is implemented on a computing device external to a reporting entity computing device of a reporting entity and/or external to a user computing device. The report generation module 105 can communicate with the user computing device and/or reporting entity computing device over a communication network. In other embodiments, the report generation module 105 is implemented within the user computing device. The report generation module 105 can communicate with another computer over the communication network, such as from the user computing device to the reporting entity computing device.

In one embodiment, a bank operates in a first country, a second country, and/or other countries. The first country has a first reporting entity 145 to which the bank is required to report certain information through the submission of compliance reports. The second country has a second reporting entity 150 to which the bank is required to report certain information through the submission of compliance reports. In one embodiment, the first reporting entity 145 and the second reporting entity 150 require different sets of information, such as where the first reporting entity 145, but not the second reporting entity 150, requires the submission of a number of years for which a user has been a client of the bank. Compliance reports for the first reporting entity 145 and compliance reports for the second reporting entity 150 can differ in structure, such as what data fields are to be specified, where such data fields are located within the compliance report, how such data fields are structured and defined, etc. Thus, compliance reports can be submitted in the same format, such as XML, but with different structures that can be defined from XSDs or other compliance report definitions provided by the reporting entities.

The report generation module 105 is configured to receive a data source definition of a set of data sources comprising data for populating compliance reports to send to reporting agencies. In one embodiment, the bank maintains data repositories 115, such as databases. The bank identifies data sources, such as a first data source 120 of a first set of columns within one or more tables, to use as source data for populating compliance reports that are submitted to the second reporting entity 150. In this way, different sets of source data can be used for populating compliance reports for different reporting entities, such as data from different columns within tables of the data repositories 115.

The report generation module 105 is configured to identify a reporting entity for which a compliance report is to be generated. In one embodiment, the bank may provide an indication that the compliance report is to be generated for the second reporting entity 150. Accordingly, the report generation module 105 retrieves a compliance report definition associated with the second reporting entity 150. The compliance report definition specifies fields of the compliance report to populate with data and the structure of such fields (e.g., location, size, expected data type, etc.). In one embodiment, a data source mapping 125 is created to map the set of data sources, such as the first data source 120 of the first set of columns, as inputs into fields of the compliance report defined by the compliance report definition. The data source mapping 125 is input into a report generation model 110 that is configured to populate the fields of the compliance report with the inputs to generate the compliance report. In one embodiment, the report generation module 105 is configured to build a connector module 130 using the data source mapping 125. The connector module 130 is configured to connect to the data repositories 115 for data retrieval from the first data source 120.

The report generation module 105 is configured to generate a set of user interface elements 140 (e.g., a button, a text box, a drop down list, an image, a label, etc.) corresponding to the first data source 120 and the compliance report definition associated with the second reporting entity 150. In one embodiment, the report generation module 105 determines that a first text box is to be used to hold a user name from the first data source 120, wherein the user name is used to populate a user name field of the compliance report. In this way, the set of user interface elements 140 are dynamically generated and tailored to specific data sources and compliance report definitions. The report generation module 105 is configured to construct a user interface 135 populated with the user interface elements 140. The user interface 135 is rendered through a display of a computing device. A user can view source data that will be populated in the fields of the compliance report, edit the source data, validate the source data, etc. through the user interface 135.

The report generation module 105 receives a report generation command through the user interface 135. Accordingly, the report generation model 110 generates the compliance report according to the compliance definition by populating fields of the compliance report with corresponding data from the first data source 120. The report generation module 105 is configured to validate the compliance report. In one embodiment, the bank provides validation rules 150, such as within a spreadsheet document that can be parsed by the report generation module 105 for identifying the validation rules 150. The validation rules are used to determine whether there is an error within the compliance report. The error could relate to missing data, a field being populated with an incorrect data type, etc. The error can be displayed through the user interface 135 so that the error can be corrected.

Once validated, the report generation module 105 sends the compliance report to a computing device of the second reporting entity 150. Acknowledgment processing functionality 155 is configured to receive, parse, and process an acknowledgement message received from the second reporting entity 150 in response to the compliance report. In one embodiment, the acknowledgment processing functionality 155 is capable of reading delimiter and fixed length text formats. The acknowledgment processing functionality 155 can parse the acknowledgment message to determine a status of the submission of the compliance report, such as accepted, in process, an error, rejected, etc. The status can be stored within a database, displayed through the user interface 135, etc.

In this way, the report generation module 105 is configured to dynamically generate user interfaces and compliance reports that are tailored to specific data sources and reporting entities without the use of extensive coding knowledge or custom coding of multiple programs that are each individually tailored to a specific data source and compliance report structure. In one embodiment, a different set of user interface elements may be generated for different compliance entities and/or different data sources. In another embodiment, different fields may be populated within compliance reports for difference compliance entities and/or different data sources.

In one embodiment, a plurality of compliance report definitions are acquired by the report generation module 105 over time, such as compliance report definitions for different reporting entities and/or different countries. The plurality of compliance report definitions are evaluated to identify a plurality of fields of data within the plurality of compliance report definitions (e.g., a user name, account number, social security number, transaction amount, etc.). The report generation model 110 is trained using the plurality of fields. In this way, the report generation model 110 is trained to identify source data and/or user interface elements corresponding to fields of data for each compliance report definition. Thus, the report generation model 110 can more precisely identify source data, map source data to fields within varying compliance reports, and populate such compliance reports with correct data.

In one embodiment, the report generation model 110 is updated based upon an update received for a compliance report definition. For example, the first reporting entity 145 may add a new field into a first compliance report definition associated with the first reporting entity 145. In this way, the updated report generation model may specify an updated set of user interface elements to use for constructing a user interface for generating compliance reports according to the updated first compliance report definition, such as a new user interface element for the new field. The updated report generation model may specify an updated set of fields to populate within compliance reports generated according to the updated compliance report definition. Validation rules may be updated, such as to verify that source data has been populated in the new field with a correct data type.

Figure 2:
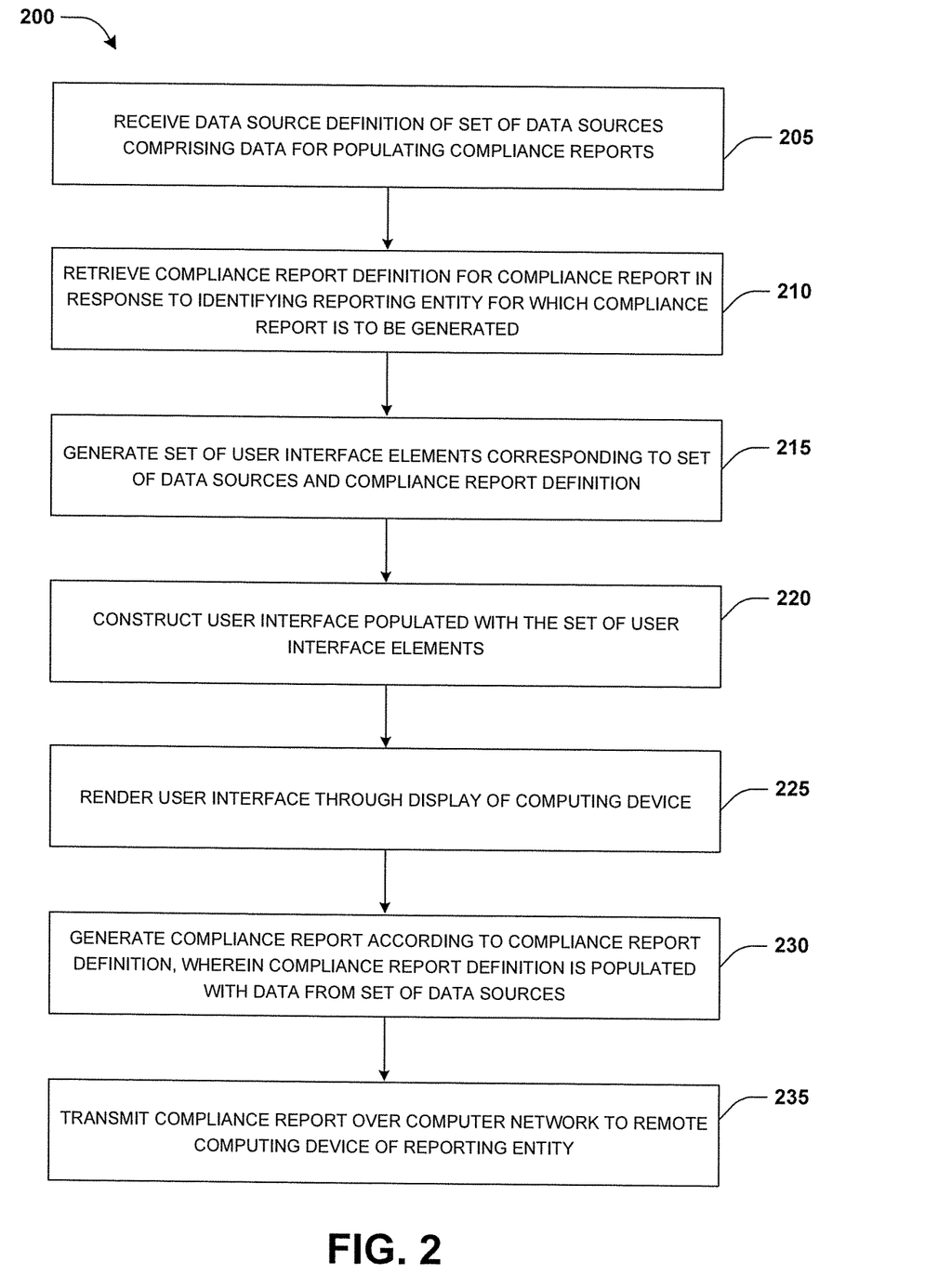
FIG. 2 illustrates an embodiment of a method associated with compliance report generation.

With reference to FIG. 2, one embodiment of a computer implemented method 200 associated with a computing platform for generating compliance reports is illustrated. In one embodiment, the method 200 is performed by the report generation module 105 utilizing various computing resources of the computer 515, such as the processor 520 for executing instructions associated with generating user interfaces and compliance reports. Memory 535 and/or disks 555 are used for storing data associated with generating user interfaces and compliance reports. Network hardware is used for communicating data structures and/or other data between the computer 515 and remote computers over a network, such as between a user computing device, a reporting entity computing device, etc. The method 200 is triggered upon a command to generate and submit a compliance report to a reporting entity.

Figure 3A:
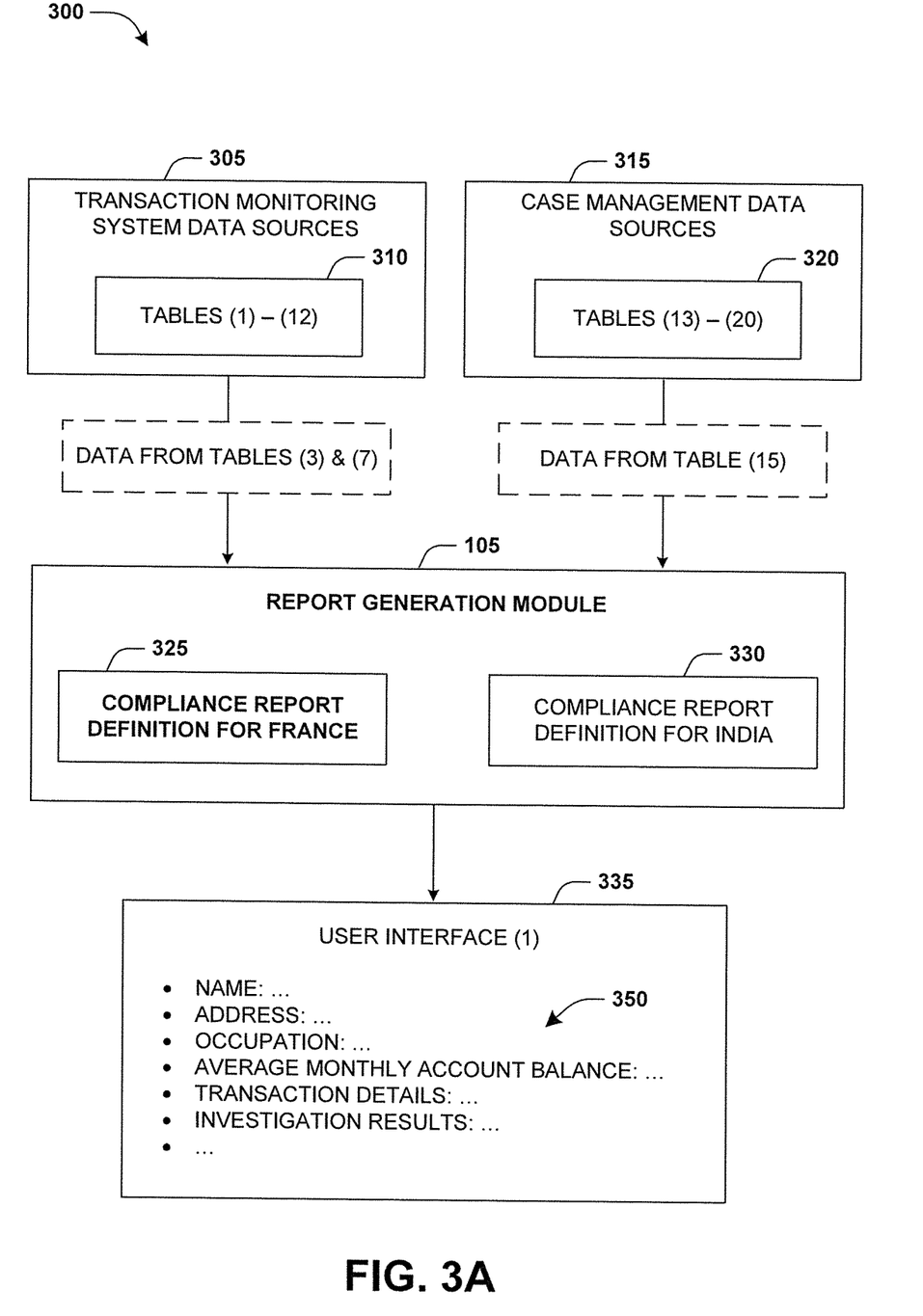
FIG. 3A illustrates an embodiment of a system associated with compliance report generation, where a user interface and a compliance report are generated based upon a compliance report definition.

A transaction monitoring system is configured to monitor banking transactions in order to identify and flag suspicious transactions, such as an out of the ordinary transfer of $100,000 from a customer's account to an external account. The transaction monitoring system stores data within transaction monitoring system data sources 305, such as within tables 310 (1) through (12). A case management system is configured to track the investigation of suspicious transactions. The case management system stores data within case management data sources 315, such as within tables 320 (13) through (20).

At 205, a data source definition, of a set of data sources comprising data for populating compliance reports, is received by the report generation module 105, as illustrated by example system 300 of FIG. 3A. In one embodiment, the data source definition specifies that data from one or more columns of table (3) and table (7) within the transaction monitoring system data sources 305 and one or more columns of table (15) from the case management data sources 315 is to be used as source data as input into a compliance report for France.

At 210, a compliance report definition for the compliance report is retrieved in response to identifying a reporting entity for which the compliance report is to be generated. In one embodiment, a user, a database entry, a banking application, a file, etc. may provide an indication that the compliance report is to be created for France. Accordingly, the report generation module 105 obtains a compliance report definition 325 for France.

At 215, a first set of user interface elements 350 are generated to correspond to the one or more columns of the table (3), the table (7), and the table (15) and/or data fields specified by the compliance report definition 325 for France. In one embodiment, the first set user interface elements 350 correspond to a name field and name data source column, an address field and address data source column, an occupation field and occupation data source column, an account balance average field and an account balance average data source column, a transaction details field and a transaction details data source column, an investigation results field and an investigation results data source column, etc.

At 220, a first user interface 335 is constructed. The first user interface 335 is populated with the first set of user interface elements 350. At 225, the first user interface 335 is rendered through a display of a computing device to a user. In this way, the user can view fields that will be populated within the compliance report (e.g., fields defined by the compliance report definition 325 for France), view source data that will be populated within the fields, edit (e.g., add, remove, and/or modify) the source data and/or fields, perform validation, etc. through the first user interface 335.

At 230, the compliance report is generated according to the compliance report definition 325 for France. In particular, the compliance report is populated with corresponding data from the one or more columns of the table (3), the table (7), and the table (15) based upon the receipt of a report generation command through the first user interface 335. In one embodiment, validation is performed upon the compliance report to determine whether fields are populated and are populated with correct data. At 235, the compliance report is transmitted over a computing network to a remote computing device of the reporting entity of France.

Figure 3B:
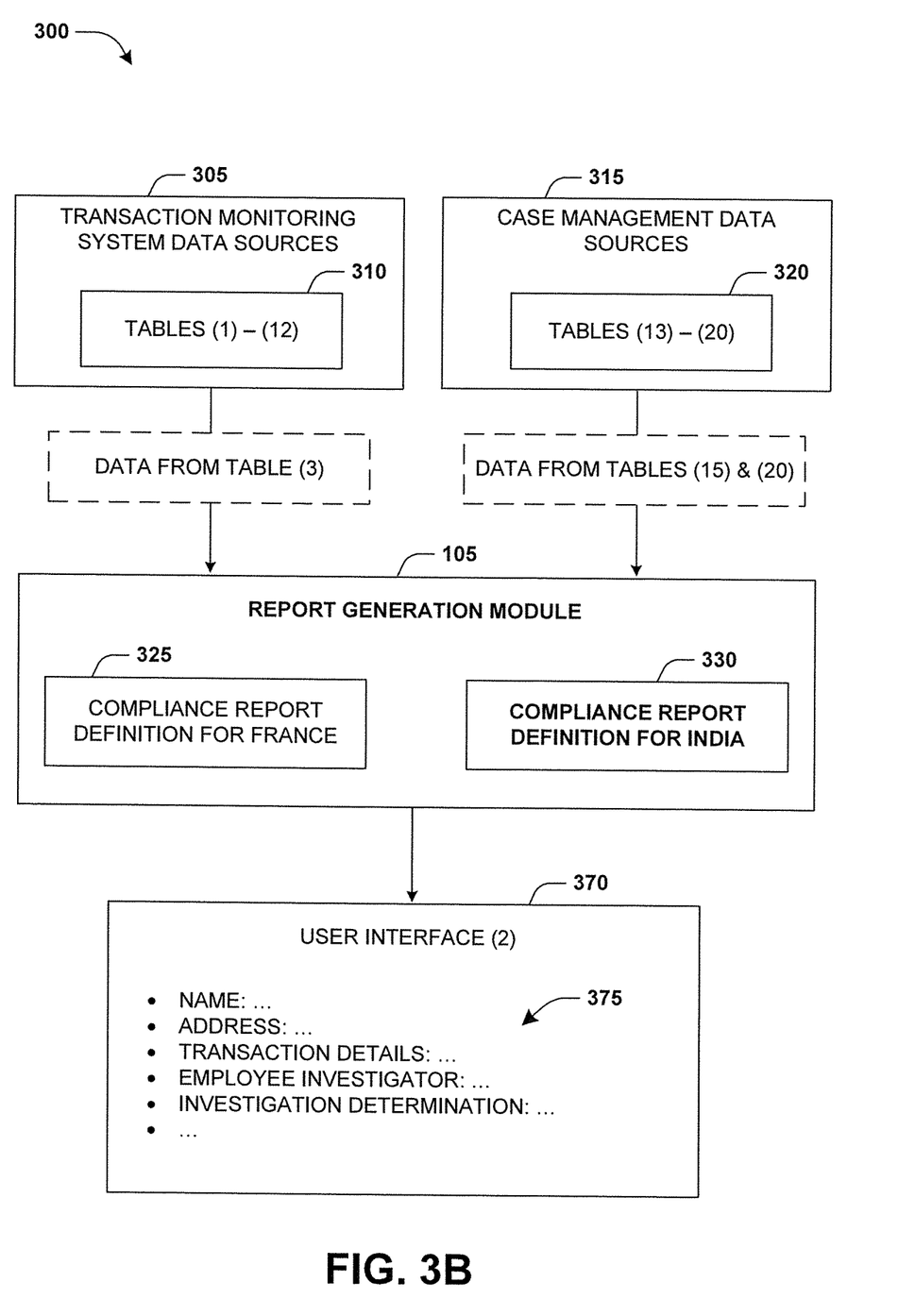
FIG. 3B illustrates an embodiment of a system associated with compliance report generation, where a second user interface and a second compliance report are generated based upon a second compliance report definition.

In one embodiment, a second compliance report is to be created for India, as illustrated by example system 300 of FIG. 3B. The report generation module 105 receives a second data source definition specifying a second set of data sources comprising one or more columns within table (3), table (15), and table (20) that comprise source data for populating the second compliance report. The report generation module 105 retrieves a compliance report definition 330 for India. The compliance report definition 330 for India may specify a different set of fields for populating the second compliance report than the compliance report definition 325 for France. The report generation module 105 generates a second set of user interface elements 375 corresponding to the second set of data sources and the compliance report definition 330 for India. In one embodiment, the second set of user interface elements 375 correspond to a name field and name data source column, an address field and address data source column, a transaction details field and a transaction details data source column, an employee investor field and an employee investigator data source column, an investigation determination field and an investigation determination data source column, etc.

A second user interface 370 is constructed. The second user interface 370 is populated with the second set of user interface elements 375. The second user interface 370 is rendered through the display of the computing device to the user. In this way, the user can view fields that will be populated within the compliance report (e.g., fields defined by the compliance report definition 330 for India), view source data that will be populated within the fields, edit (e.g., add, remove, and/or modify) the source data and/or fields, perform validation, etc. through the second user interface 370.

The second compliance report is generated according to the compliance report definition 330 for India. In particular, the second compliance report is populated with corresponding data from the one or more columns of the table (3), the table (15), and the table (20) based upon the receipt of a report generation command through the second user interface 370. In one embodiment, validation is performed upon the compliance report to determine whether fields are populated and are populated with correct data. The second compliance report is transmitted over the computing network to a second remote computing device of the reporting entity of India.

Figure 4:
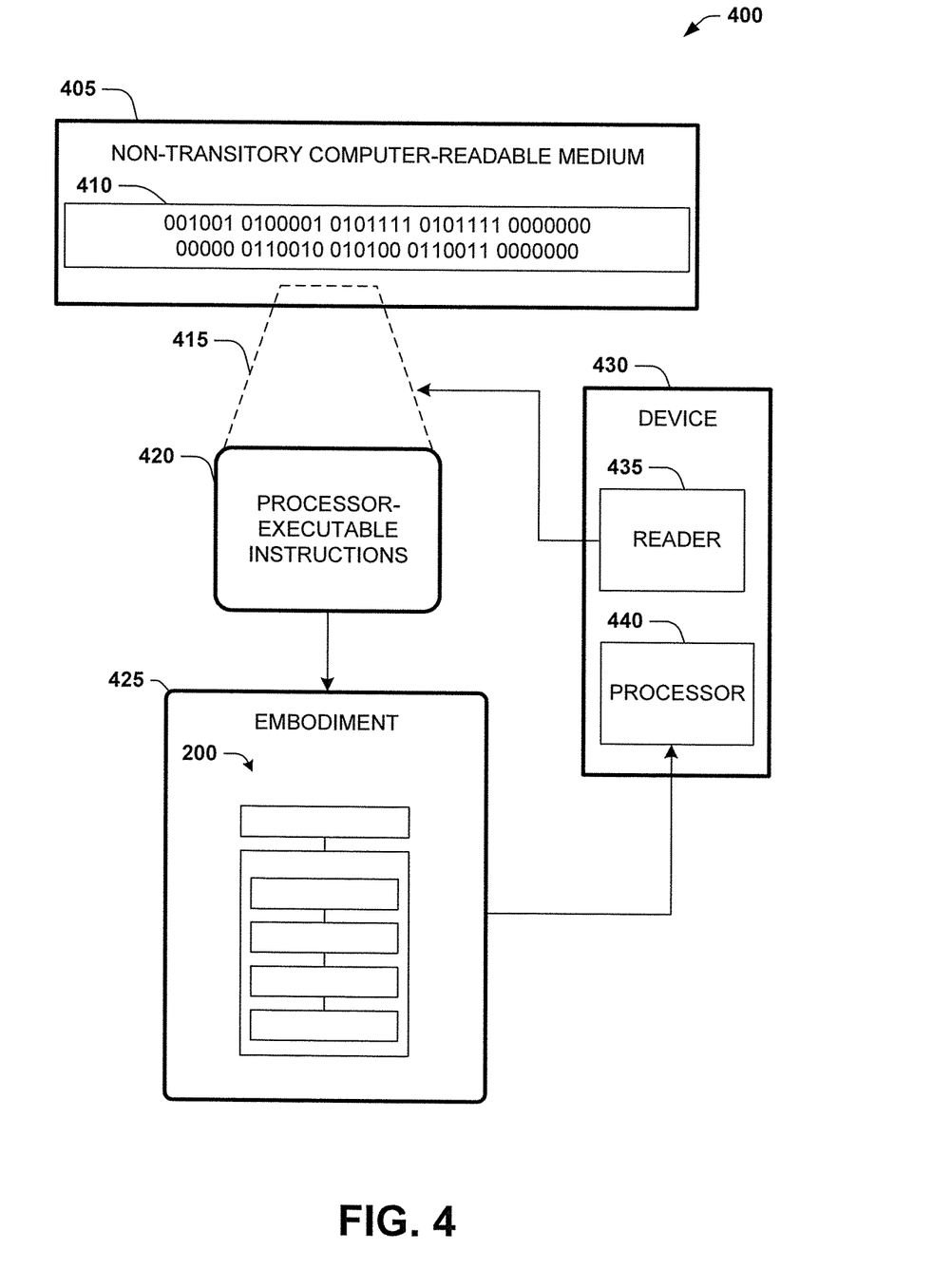
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the report generation module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of the report generation module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
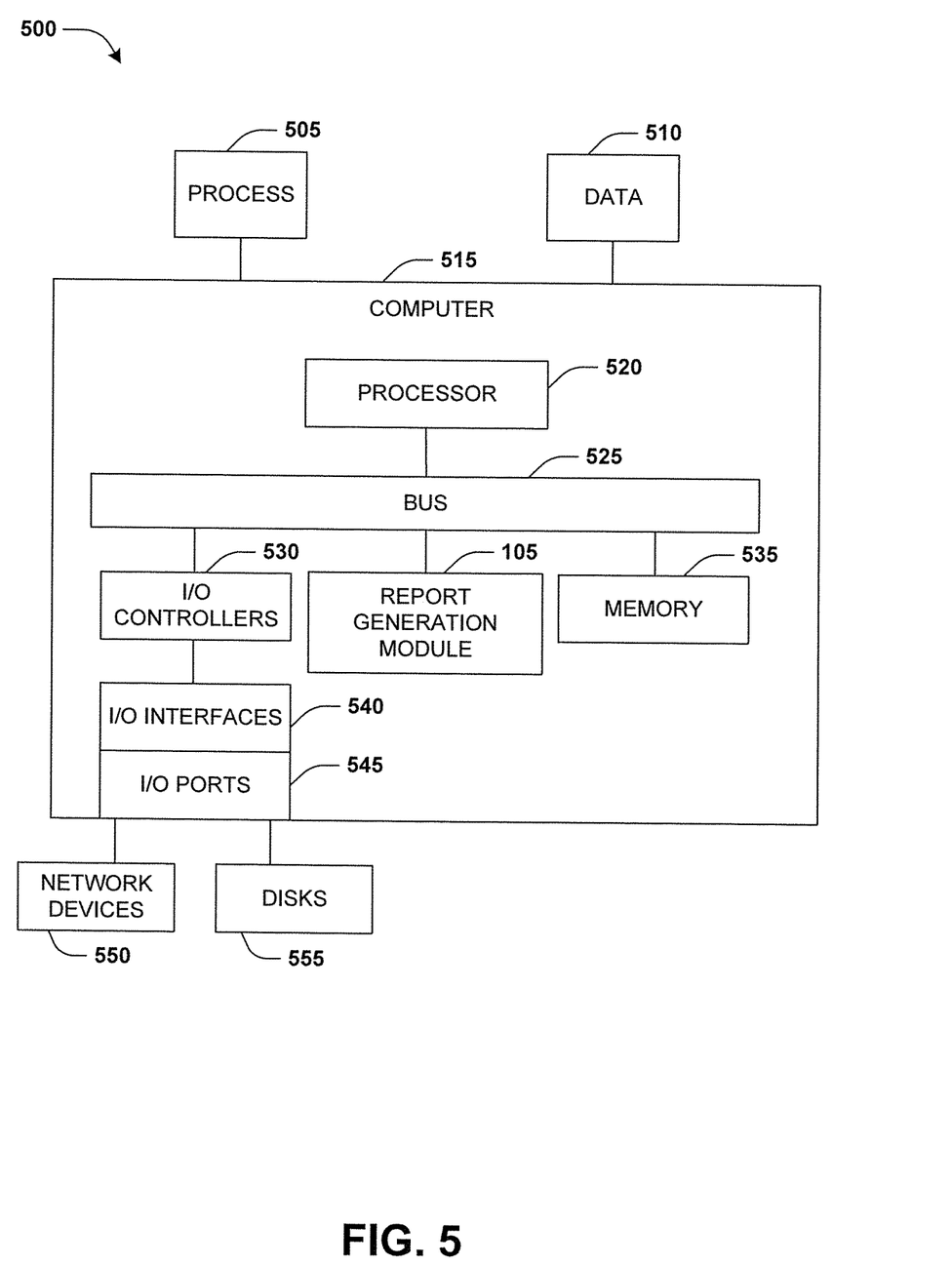
FIG. 5 illustrates an embodiment of a computing system configured with the example systems and/or methods disclosed.

FIG. 5 illustrates an example computing device 500 that is configured and/or programmed with one or more of the example systems and methods described herein, and/or equivalents. The example computing device 500 may be the computer 515 that includes a processor 520, a memory 535, and I/O ports 545 operably connected by a bus 525. In one embodiment, the, the computer 515 may include logic of the report generation module 105 configured to facilitate the system 100 and/or the method 200 shown in FIGS. 1-2. In different embodiments, the logic of the report generation module 105 may be implemented in hardware, a non-transitory computer-readable medium 505 with stored instructions, firmware, and/or combinations thereof. While the logic of the report generation module 105 is illustrated as a hardware component attached to the bus 525, it is to be appreciated that in other embodiments, the logic of the report generation module 105 could be implemented in the processor 520, stored in memory 535, or stored in disk 555.

In one embodiment, logic of the report generation module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the report generation module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multi-processor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with input/output (I/O) devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer causes the processor to:
   in response to receiving a first command to generate a first compliance report for a first selected country from a plurality of countries, wherein the first command does not include or identify user inputted data to populate the first compliance report:
      (i) based on the first compliance report and the first selected country from the first command, identify and retrieve a first data source definition from a plurality of data source definitions that is associated with the first selected country, wherein each of the plurality of data source definitions are associated with a different country;
      wherein the first data source definition identified (i) is associated with the first compliance report of the first selected country, and (ii) identifies a first set of columns within one or more data tables from a data repository that comprise source data for populating the first compliance report for the first selected country;
      (ii) using the first data source definition, connect to the one or more data tables and retrieve first data from the first set of columns within the one or more data tables as identified in the first data source definition;
   in response to receiving a second command to generate a second compliance report for a second selected country from the plurality of countries, wherein the second command does not include data to populate in the second compliance report:
      (i) based on the second selected country, identify and retrieve a second data source definition from the plurality of data source definitions that is associated with the second selected country;
      wherein the second data source definition identifies a second set of columns within a second set of data tables from the data repository that comprise data for populating the second compliance report for the second selected country;
      (ii) using the second data source definition, connect to the second set of data tables and retrieve second data from the second set of columns within the second set of data tables as identified in the second data source definition;
      wherein the first data for the first selected country and the second data for the second selected country are retrieved from the same data repository but from different columns within the one or more data tables;
   based on the first command, identify a reporting entity associated with the first selected country for which the first compliance report is to be generated;
   in response to identifying the reporting entity for the first selected country for which the first compliance report is to be generated, identify and retrieve a first compliance report definition from a plurality of compliance report definitions wherein each of the plurality of compliance report definitions are associated with one of the plurality of countries;
   wherein the first compliance report definition identified (i) is associated with the first selected country and (ii) specifies fields of the first compliance report to populate with data from the first set of columns identified by the first data source definition and a structure of the fields including location within the first compliance report and a data type of the fields;
   generate a set of user interface elements corresponding to the first data retrieved from the data repository from the first set of columns identified by the first data source definition and the first compliance report definition;
   construct a user interface with the set of user interface elements wherein the processor populates the set of user interface elements with at least the first data;
   render the user interface through a display of a computing device;
   in response to receiving a report generation command through the user interface, generate the first compliance report according to the first compliance report definition, wherein the first compliance report is populated, by the processor, with the first data from the data repository from the first set of columns within the one or more data tables identified by the first data source definition;
   transmit the first compliance report over a computing network to a remote computing device of the reporting entity associated with the first selected country; and
   generate the second compliance report according to a second compliance report definition, wherein the second compliance report is populated with the second data from the data repository from the second set of columns within the second set of data tables identified by the second data source definition.

2. The non-transitory computer-readable medium of claim 1, wherein the computer-executable instructions comprise computer-executable instructions to cause the processor to:
   store, within a database, a status of submission of the first compliance report to the remote computing device of the reporting entity associated with the first selected country.

3. The non-transitory computer-readable medium of claim 1, wherein the computer-executable instructions comprise computer-executable instructions to cause the processor to:
   display, through the user interface, a status of submission of the first compliance report to the remote computing device of the reporting entity associated with the first selected country.

4. The non-transitory computer-readable medium of claim 1, wherein the computer-executable instructions comprise computer-executable instructions to cause the processor to:
   create a data source mapping between the set of data sources and inputs into fields of the first compliance report; and
   input the data source mapping into a report generation model configured to populate the fields of the first compliance report with the inputs to generate the first compliance report.

5. The non-transitory computer-readable medium of claim 4, wherein the computer-executable instructions comprise computer-executable instructions to cause the processor to:
   build a connector module using the data source mapping, wherein the connector module is configured to connect to the set of data sources for data retrieval.

6. The non-transitory computer-readable medium of claim 1, wherein the computer-executable instructions comprise computer-executable instructions to cause the processor to:
prior to transmitting the first compliance report:
validating the first compliance report generated comprising:
(i) parsing a rule definition document to identify a set of validation rules;
(ii) executing the set of validation rules upon the first compliance report to determine whether the first compliance report comprises one or more errors; and
(iii) in response to identifying an error, populating the user interface with information regarding the error;
in response to validating the first compliance report, transmitting the first compliance report over the computing network to the remote computing device of the reporting entity associated with the first selected country; and
perform an acknowledgment function including (i) receiving an acknowledgement message from the remote computing device over the computing network; (ii) parsing the acknowledgment message to determine a status of submission of the compliance report including determining whether the first compliance report was accepted or rejected by the remote computing device; and (iii) displaying the status on the user interface.

7. A computing system, comprising:
a processor connected to memory; and
a report generation module stored on a non-transitory computer readable medium and configured with instructions that when executed by the processor cause the processor to:
in response to receiving a first command to generate a first compliance report for a first selected country from a plurality of countries, wherein the first command does not include or identify user inputted data to populate the first compliance report:
(i) based on the first compliance report and the first selected country from the first command, identify and retrieve a first data source definition from a plurality of data source definitions that is associated with the first selected country, wherein each of the plurality of data source definitions are associated with a different country;
wherein the first data source definition identified (i) is associated with the first compliance report of the first selected country, and (ii) identifies a first set of columns within one or more data tables from a data repository that comprise source data for populating the first compliance report for the first selected country;
(ii) using the first data source definition, connect to the one or more data tables and retrieve first data from the first set of columns within the one or more data tables as identified in the first data source definition;
in response to receiving a second command to generate a second compliance report for a second selected country from the plurality of countries, wherein the second command does not include user inputted data for populating the second compliance report:
(i) based on the second selected country, identify and retrieve a second data source definition from the plurality of data source definitions that is associated with the second selected country;
wherein the second data source definition identifies a second set of columns within a second set of data tables from the data repository that comprise data for populating the second compliance report for the second selected country;
(ii) using the second data source definition, connect to the second set of data tables and retrieve second data from the second set of columns within the second set of data tables as identified in the second data source definition;
wherein the first data for the first selected country and the second data for the second selected country are retrieved from the same data repository but from different columns within the one or more data tables;
based on the first command, identify a reporting entity associated with the first selected country for which the first compliance report is to be generated;
in response to identifying the reporting entity for the first selected country for which the first compliance report is to be generated, identify and retrieve a compliance report definition from a plurality of compliance report definitions wherein each of the plurality of compliance report definitions are associated with one of the plurality of countries;
wherein the first compliance report definition identified (i) is associated with the first selected country and (ii) specifies fields of the first compliance report to populate with data from the first set of columns identified by the first data source definition and a structure of the fields including location within the first compliance report and a data type of the fields;
generate a set of user interface elements corresponding to the first data retrieved from the data repository from the first set of columns identified by the first data source definition and the first compliance report definition;
construct a user interface with the set of user interface elements wherein the processor populates the set of user interface elements with at least the first data;
render the user interface through a display of a computing device;
in response to receiving a report generation command through the user interface, generate the first compliance report according to the first compliance report definition, wherein the first compliance report is populated with the first data from the data repository from the first set of columns within the one or more data tables identified by the first data source definition;
transmit the first compliance report over a computing network to a remote computing device of the reporting entity associated with the first selected country; and
generate the second compliance report according to a second compliance report definition, wherein the second compliance report is populated with the second data from the data repository from the second set of columns within the second set of data tables identified by the second data source definition.

8. The computing system of claim 7, wherein the report generation module further includes instructions for:
executing a set of validation rules upon the first compliance report to determine whether the first compliance report comprises one or more errors;
wherein the error corresponds to a field of the first compliance report missing data.

9. The computing system of claim 7, wherein the report generation module further includes instructions for:
executing a set of validation rules upon the first compliance report to determine whether the first compliance report comprises one or more errors;

wherein the error corresponds to a field of the first compliance report being populated with data having an incorrect data type.

10. The computing system of claim 7, wherein the instructions comprise instructions that cause the processor to:
evaluate the plurality of compliance report definitions to identify a plurality of fields of data within the plurality of compliance report definitions; and
train a report generation model using the plurality of fields, wherein the report generation model is trained to identify user interface elements corresponding to fields of data for each compliance report definition.

11. The computing system of claim 10, wherein the plurality of compliance report definitions corresponds to different reporting entities.

12. The computing system of claim 10, wherein the plurality of compliance report definitions corresponds to different countries.

13. A computer-implemented method performed by a computing device comprising a processor, the computer-implemented method comprising:
maintaining a plurality of compliance report definitions in a database, wherein each compliance report definition is associated with one country of a plurality of countries and an associated compliance report;
wherein each compliance report definition specifies a mapping between fields of the associated compliance report and source data from an associated data source definition, including a structure of the fields including location within the associated compliance report and a data type of the fields;
maintaining a plurality of data source definitions in the database, wherein each data source definition is associated with a different country of the plurality of countries; and
wherein each data source definition identifies source data for populating an associated compliance report for a country by identifying data locations from one or more data tables including an identification of specified columns within the one or more data tables that comprise the source data for the associated compliance report;
providing a user interface that allows input of a command requesting that a compliance report is to be generated for each of at least a first selected country and a second selected country from the plurality of countries;
wherein the command does not include data to populate the compliance report and wherein a different compliance report is to be generated for the first selected country and the second selected country;
in response to receiving the command:
(a) for the first selected country from the command:
(i) identifying and retrieving a first data source definition from the plurality of data source definitions that is associated with the first selected country from the command, wherein the first data source definition identifies first source data to populate a first compliance report for the first selected country;
(ii) based on the first data source definition, connecting to the one or more data tables and retrieving the first source data from the one or more data tables as identified in the first data source definition; and
(iii) identifying and retrieving a first compliance report definition associated with the first selected country for mapping the first source data into the first compliance report;
(b) for the second selected country from the command:
(i) identifying and retrieving a second data source definition from the plurality of data source definitions that is associated with the second selected country from the command, wherein the second data source definition identifies second source data to populate a second compliance report associated the second selected country;
(ii) based on the second data source definition, connecting to the one or more data tables and retrieving the second source data from the one or more data tables as identified in the second data source definition;
(iii) identifying and retrieving a second compliance report definition associated with the second selected country for mapping the second source data into the second compliance report;
generating the first compliance report on a graphical user interface based on the first compliance report definition including the structure of the fields;
populating the fields of the first compliance report with the first source data based on the mapping from the first compliance report definition;
generating the second compliance report on the graphical user interface based on the second compliance report definition including the structure of the fields;
populating the fields of the second compliance report with the second source data based on the mapping from the second compliance report definition;
transmitting the first compliance report over a computing network to a remote computing device associated with a first reporting entity associated with the first selected country; and
transmitting the second compliance report over the computing network to a remote computing device associated with a second reporting entity associated with the second selected country.

14. The computer-implemented method of claim 13, further comprising:
receiving, by the processor, an update to the compliance report definition; and
updating a report generation model using the update to create an updated report generation model, wherein the report generation model is configured to generate compliance reports.

15. The computer-implemented method of claim 14, wherein the updated report generation model specifies an updated set of user interface elements to use for constructing the user interface for generating compliance reports according to the compliance report definition.

16. The computer-implemented method of claim 14, wherein the updated report generation model specifies an updated set of fields to populate within compliance reports generated according to the compliance report definition.

17. The computer-implemented method of claim 13, wherein prior to transmitting the first compliance report, the method comprising:
validating the first compliance report generated comprising:
(i) parsing a rule definition document to identify a set of validation rules;
(ii) executing the set of validation rules upon the first compliance report to determine whether the first compliance report comprises one or more errors; and
(iii) in response to identifying an error, populating the user interface with information regarding the error;

in response to validating the first compliance report, transmitting the first compliance report over the computing network to the remote computing device of the reporting entity associated with the first selected country; and perform an acknowledgment function including (i) receiving an acknowledgement message from the remote computing device over the computing network; (ii) parsing the acknowledgment message to determine a status of submission of the compliance report including determining whether the first compliance report was accepted or rejected by the remote computing device; and (iii) displaying the status on the user interface.

\* \* \* \* \*